(12) United States Patent
Sethu et al.

(10) Patent No.: US 12,223,333 B2
(45) Date of Patent: Feb. 11, 2025

(54) SYSTEM AND METHOD TO UPDATE SYSTEM RECOMMENDED SETTINGS FOR CORRESPONDING OPERATING SYSTEM VERSION

(71) Applicant: Dell Products L.P., Round Rock, TX (US)

(72) Inventors: Karthik Sethu, Bangalore (IN); Anusha Bhaskar, Bangalore (IN); Harsha D. Naik, Bangalore (IN)

(73) Assignee: Dell Products L.P., Round Rock, TX (US)

(*) Notice: Subject to any disclaimer, the term of this patent is extended or adjusted under 35 U.S.C. 154(b) by 415 days.

(21) Appl. No.: 17/581,298

(22) Filed: Jan. 21, 2022

(65) Prior Publication Data

US 2023/0236844 A1 Jul. 27, 2023

(51) Int. Cl.
| | |
|---|---|
| *G06F 9/44* | (2018.01) |
| *G06F 1/24* | (2006.01) |
| *G06F 8/71* | (2018.01) |
| *G06F 9/445* | (2018.01) |

(52) U.S. Cl.
CPC ............ *G06F 9/44505* (2013.01); *G06F 1/24* (2013.01); *G06F 8/71* (2013.01)

(58) Field of Classification Search
CPC ................. G06F 1/32; G06F 9/44; G06F 1/12
See application file for complete search history.

(56) References Cited

U.S. PATENT DOCUMENTS

| | | | |
|---|---|---|---|
| 2006/0005016 A1* | 1/2006 | Lee ........................... | G06F 8/64 714/E11.207 |
| 2006/0031664 A1* | 2/2006 | Wilson ...................... | G06F 8/65 713/1 |
| 2020/0220902 A1* | 7/2020 | Schlotman, Jr. .... | H04L 41/0816 |
| 2022/0338292 A1* | 10/2022 | Zhang .................... | G06F 9/485 |

* cited by examiner

*Primary Examiner* — Keshab R Pandey
(74) *Attorney, Agent, or Firm* — Terrile, Cannatti & Chambers, LLP; Emmanuel A. Rivera (57) ABSTRACT

System settings for an information handling system are updated based on the operating system version of an information handling system that is installed or updated on the information handling system. An operating system template to the version of the operating system is retrieved and staged to a shared memory access/partition accessible by a basic input/output system (BIOS) of information handling system. A system policy enforcer of the BIOS accesses configuration settings from the staged corresponding operating system template and applies the accessed accessing configuration settings to the information handling system.

20 Claims, 6 Drawing Sheets

```
<SystemConfiguration>
<OperatingSystem type="windows server 22" >
    <SupportedSystems>x515</SupportedSystems>
    <Attribute Name="TpmSecurity">On</Attribute>
    <Attribute Name="Tpm2Hierarchy">Enabled</Attribute>
    <Attribute Name="SecureBoot">Enabled</Attribute>
    <Attribute Name="SecureBootPolicy">Standard</Attribute>
</OperatingSystem>
<OperatingSystem type=" windows server 16" >
    <SupportedSystems>x440, x515   </SupportedSystems>
    <HardwareComponent>NA </HardwareComponent>
    <Attribute Name="ProcX2Apic">Disabled</Attribute>
</OperatingSystem>
 <OperatingSystem type=" windows server 19" >
    <SupportedSystems> x616 </SupportedSystems>
    <HardwareComponent>
        <Processor>AMD EPYC 7xx2 (AMD ROME)</Processor>
        <Processor>Intel XX </Processor>
    </HardwareComponent>
  <Attribute Name="WorkloadProfile">NotAvailable</Attribute>
  <Attribute Name="ProcX2Apic">Disabled</Attribute>
</OperatingSystem>
 . . . .
</SystemConfiguration>
```
Policy Template

SYSTEM AND METHOD TO UPDATE SYSTEM RECOMMENDED SETTINGS FOR CORRESPONDING OPERATING SYSTEM VERSION

BACKGROUND OF THE INVENTION

Field of the Invention

The present invention relates to information handling systems. More specifically, embodiments of the invention provide updating information handling system settings based on the corresponding operating system and basic input/output system (BIOS).

Description of the Related Art

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems implement basic input/output systems or BIOS to perform hardware initialization during the power on or booting process. BIOS further provides runtime services for operating systems and programs. Implementations provide for the BIOS to be part of firmware of the information handling systems. During hardware initialization, the BIOS can test hardware system components, and initialize the operating system of the information handling system. Typical implementations provide for BIOS to specifically work with a particular information handling system architecture.

Information handling systems, such as server computers, can be configure with BIOS settings before the installation of an operating system. Different versions of operating systems can have different recommend settings for certain attributes, which can also depend on the architecture of the information handling system.

Operating systems typically are deployed initially or as updates through a manual operation, such as by administrators of server computers. Assuring compliance can be difficult. Information handling system hardware does not have intelligence about the operating system that is to be installed/updated. Typically, there is no enforcement or warning as to the operating systems as to hardware settings when the operating system is installed, or when the operating system is running when hardware settings are updated incorrectly.

Hardware setting configuration and operating system installation are performed independently. No checks and balances are performed to assure that settings are configured as recommended. Personnel, such as server computer administrators should be aware of necessary and recommended configuration settings across different operating systems, information handling system architectural platforms, and hardware. This can be a challenge where different information handling systems are involved.—Applying the wrong or non-recommended hardware settings, can lead to operating systems not booting up and other performance issues.

Operating system vendors may publish information as to supported hardware and recommended settings to enable prior to deployments. Information handling system vendors may validate these supported hardware and recommended settings across different platforms and hardware architectures, and provide information handling system-operating system support correlated information; however, there is no automated mechanism that enforces the operating system-BIOS-information handling system correlation.

SUMMARY OF THE INVENTION

A computer-implementable method, system and non-transitory, computer-readable storage medium for updating system settings for an operating system version of an information handling system comprising: determining a version of operating system of the information handling system; retrieving a corresponding operating system template to the version of the operating system; staging the corresponding operating system template to shared memory access/partition accessible by a basic input/output system (BIOS) of information handling system; accessing configuration settings from the staged corresponding operating system template by the BIOS; and applying the accessed accessing configuration settings to the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide for a system, method, and computer readable medium to use for embedded intelligence in an information handling system, such as a server computer, that uses operating system recommended basic input/output system (BIOS) settings to be enforced during and post operating system installation, irrespective of information handling system platform and underlying hardware components.

In various implementations, a BIOS of the information handling system, provides for a system policy enforcer component/service running on the BIOS. The system policy enforcer component is further described herein. The system policy enforcer detects and applies operating system compatible system/hardware settings that are appropriate or recommend for the particular information handling system. Use of the system policy enforcer can be performed at runtime and autonomously without the need of user intervention.

Various use cases can be supported. One use case is when an operating system installation is performed on an information handling system. The system policy enforcer identifies and applies the necessary and recommended operating system certified hardware settings. In another use case, where the operating system is deployed and configured on the information handling system, in the event that any hardware system settings are to be altered, the system policy enforcer will validate applied hardware settings. If the hardware settings are compatible with the installed operating system and information handling system hardware, the settings are applied, assuring that prerequisite settings are retained, and desired security and performance parameters are not compromised.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
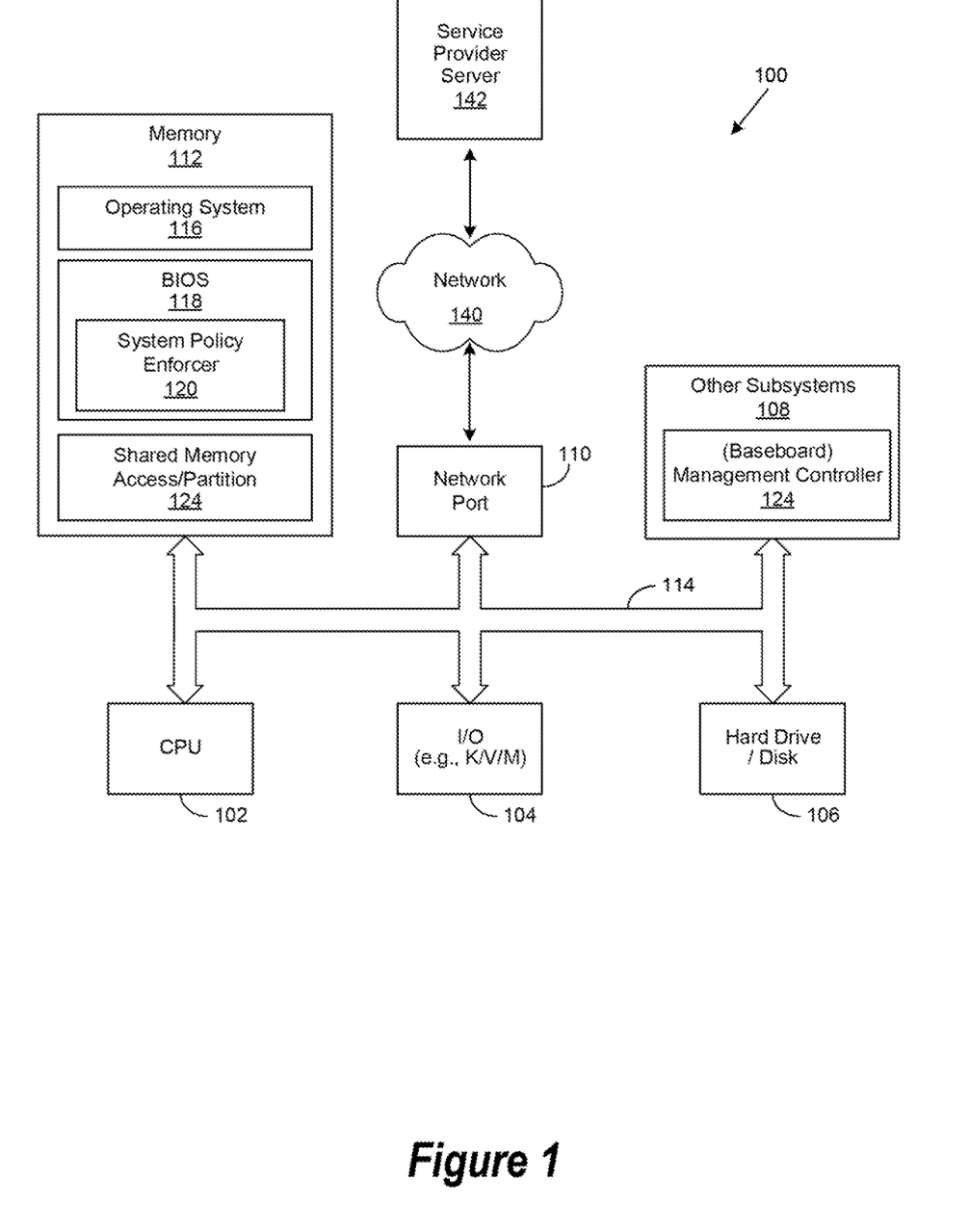
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein. As discussed, the information handling system can include a notebook or laptop personal computer (PC) or a PC integrated into a keyboard.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, other subsystems 108 include power systems that include power supply units (PSUs) as described herein that provide operational power to the information handling system 100.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include a basic input/output systems or BIOS 118. Implementations, provide for the BIOS 118 to include a system policy enforcer or SPE 120 as described above, and further described herein. Implementations further provide for the system memory 112 to include share memory access or partition 122.

In various embodiments, the information handling system 100 includes a management controller, such as a baseboard management controller 124. Implementations provide for the management controller 124 to be included in other systems 108. The management controller 124 is further described herein.

Figure 2:
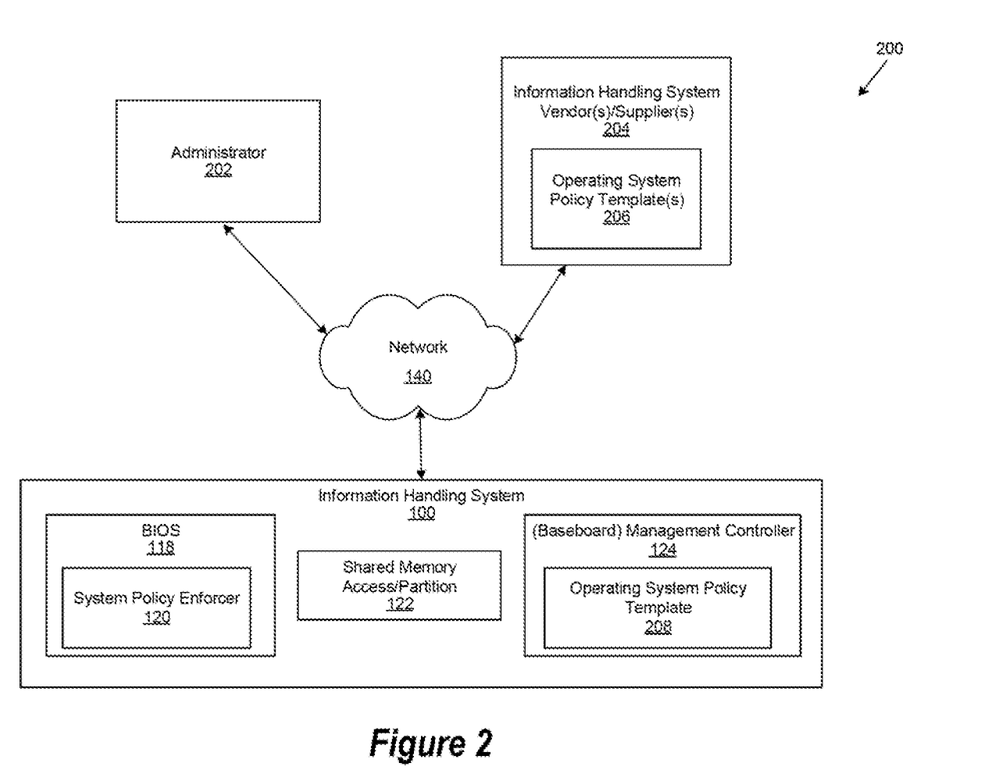
FIG. 2 illustrates a system that supports updating information handling system settings based on the corresponding operating system and basic input/output system (BIOS) of the present invention.

FIG. 2 shows a system for updating information handling system settings based on the corresponding operating system and BIOS. The system 200 includes one or more information handling systems, such as server computers, as represented by information handling system 100 as described in FIG. 1. As discussed, the information handling system 100 can be connected to a network 140 that can include one or more wired and wireless networks, including the Internet. The information handling system 100 through the network 140 can be connected to various data sources and sites, such as an administrator 202 and information handling system vendor(s)/supplier(s) sites 204.

As discussed, implementations can provide for the information handling system 100 to include BIOS 118 which includes system policy enforcer or SPE 120. Furthermore, the information handling system 100 can include management controller 124. BIOS 118 and particularly SPE 120, and the management controller 124 can have common access to shared memory access/partition 122.

Various implementations provide for information handling system vendor(s)/supplier(s) sites 204 to provide operating system policy template(s) 206. The operating system policy template(s) 206 provide requisite information as to recommended system (hardware) settings applicable over various operating systems and supported across different information handling system architectures.

Various implementations can provide for the operating system policy template(s) 206 information to include operation system type and version, information handling system (e.g., server computer) architectural platform, hardware components (e.g., processor, memory, etc.) and system (hardware) settings. The operating system policy template(s) 206 can be published in a standard consumable format authorized with vendor/supplier signatures, and made available through information handling system vendor(s)/supplier(s) sites 204. The operating system policy template(s) 206 can be considered as a matrix that provides information as to BIOS system settings supported and certified to work across various information handling system (e.g., server computer) platforms and hardware. Implementations provide operating system policy template(s) 206 to be stored in repository(ies) of information handling system vendor(s)/supplier(s).

The proper or relevant operating system policy template 208 is received by the information handling system 100, and is stored in or accessed by the management controller 124. The operating system policy template 208 may be staged in the share memory access or partition 122 and accessible by the BIOS 118/SPE 120.

Figure 3:
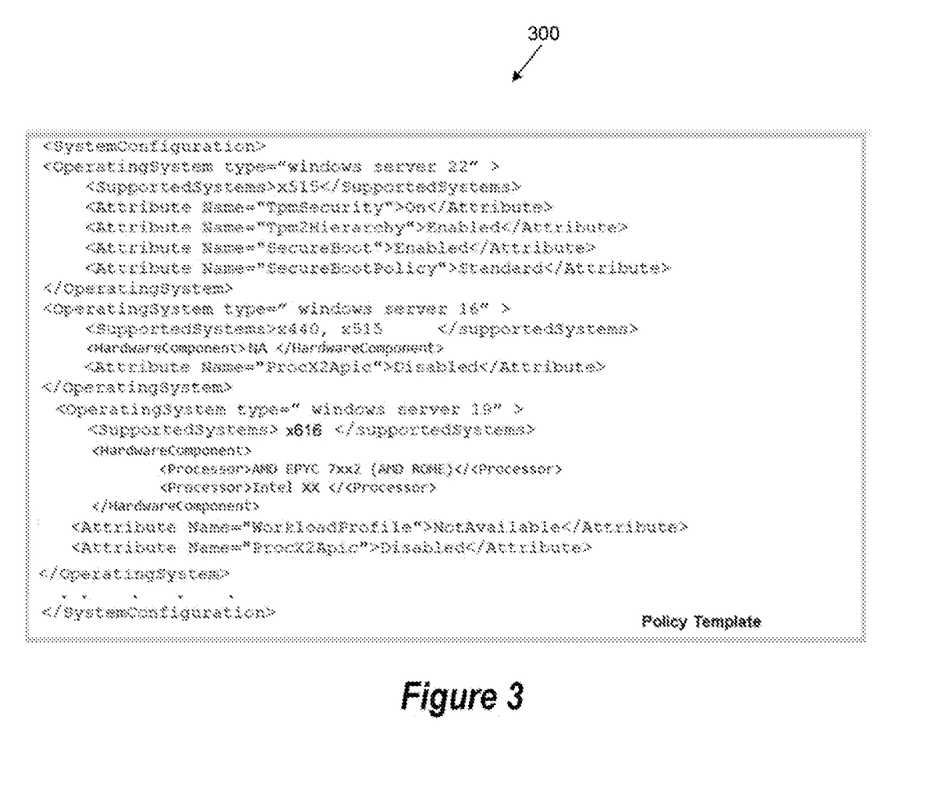
FIG. 3 illustrates an operating system policy template as implemented in the present invention.

FIG. 3 shows an example operating system policy template. The operating system policy template 300 represents an example format that can be implemented as operating system policy template(s) 206 described in FIG. 2.

As discussed above, various use cases may be implemented. In a first use case, an operating system 116 installation is performed on information handling system 100. The system policy enforcer or SPE 120 identifies and applies the necessary and recommend operating system certified hardware settings based on the operating system policy template 208. In a second use case, where the operating system 116 is already deployed and configured on the information handling system 100, in the event that any hardware system settings are to be altered, the SPE 120 will validate applied hardware settings using the operating system policy template 208. If the hardware settings are compatible with the installed operating system 116 and information handling system hardware, the settings are applied, assuring that prerequisite settings are retained, and desired security and performance parameters are not compromised. In a third use case, a request can be performed from the host or information handling system 100, which can be from applications running on the information handling system 100. The request can be for updated drivers, etc. and include receiving an updated operating system policy template(s) 206 from information handling system vendor(s)/supplier(s) sites 204.

In the use cases, the following is performed. The management controller 124 periodically syncs respective information handling system (server computer) 100 model specific operating system policy template 208. The management controller 124 can also stage the operating system policy template 208 into the share memory access or partition 122 for the BIOS 118 to access.

For the first use case where an operating system 116 is installed, the following can be specifically performed. When operating system 116 installation on the information handling system (server computer) 100 is initiated. Implementations provide for the SPE 120 that is running on the BIOS 118 to fetch operating system type and version details from metadata of the operating system 116. The SPE 120 pauses installation of the operating system 116. The SPE 120 fetches the operating system policy template 208 staged by management controller 124 from share memory access or partition 122. Using information from the operating system policy template 208, the SPE 120 retrieves applicable system (hardware) settings that match the operating system version and/or verify underlying hardware dependencies. The SPE 120 applies the system (hardware) settings to the information handling system (server computer) 100. Once the system (hardware) settings are successfully applied, a reboot can be performed to resume operating system 116 installation.

For the second use where the operating system 116 is already deployed and configured on the information handling system 100, and an attempt may be made update BIOS 118 settings, the following can be performed. The SPE 120 validates provided (e.g., user provided) settings with the operating system policy template 208 using checks against operating system 116 type/version, server model, and hardware (e.g., processor type, memory, etc.). The configurations are allowed to proceed if the provided (e.g., user provided) settings don not interfere with necessary or recommended settings. Otherwise, the provided (e.g., user provided) settings are ignored and a failure message can be provided.

Figure 4A:
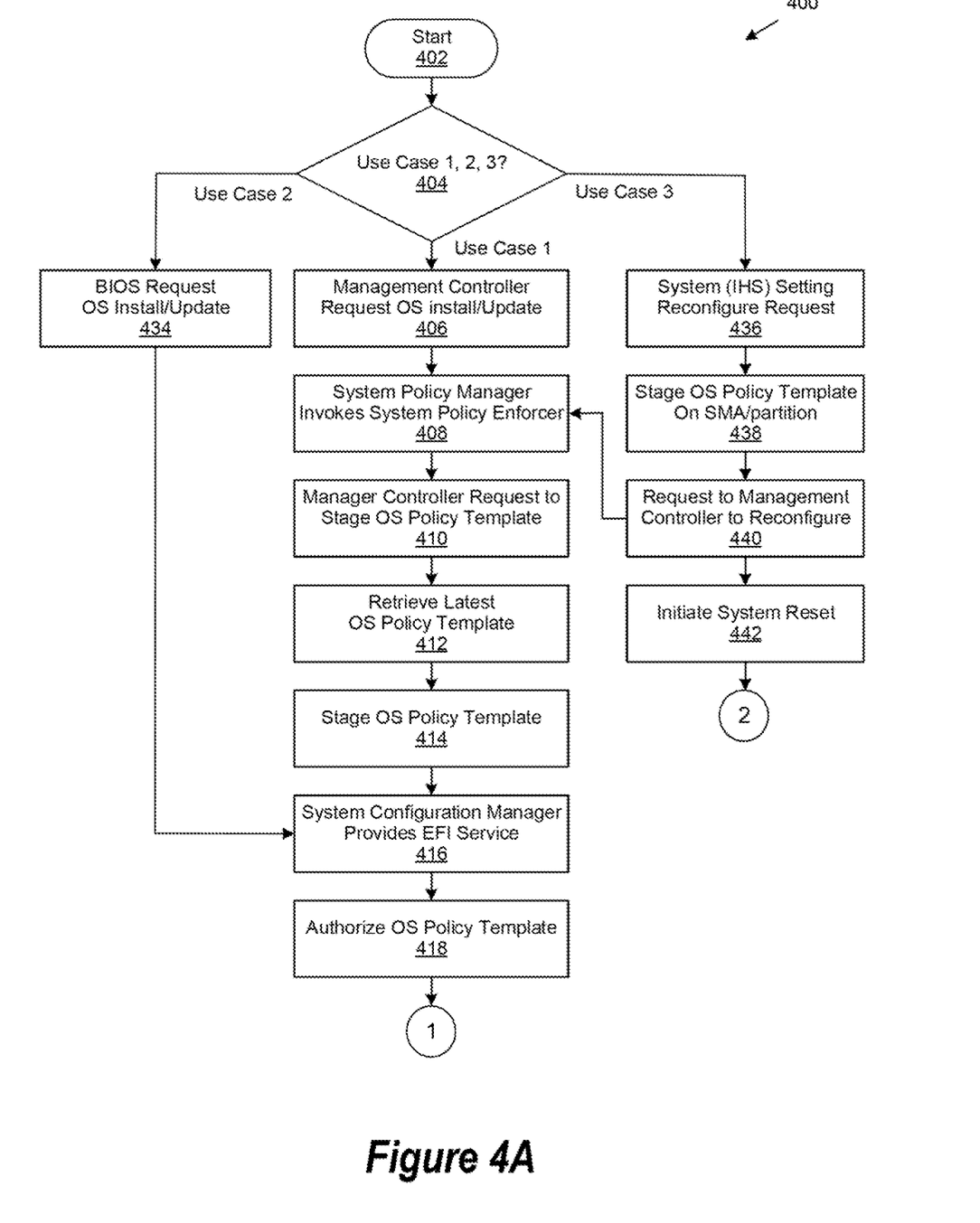
FIG. 4A is a generalized flowchart for use cases that support updating information handling system settings based on the corresponding operating system and BIOS.
Figure 4B:
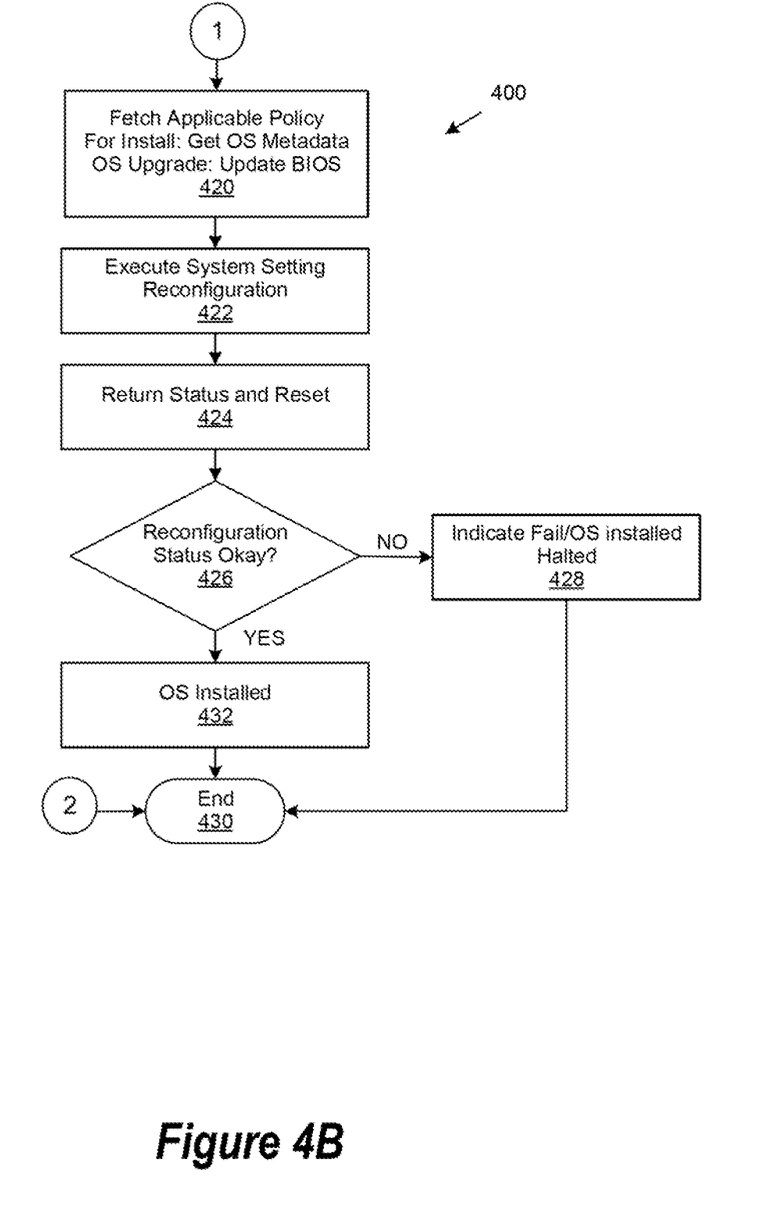
FIG. 4B is a continuation of a generalized flowchart for use cases that support updating information handling system settings based on the corresponding operating system and BIOS.

FIG. 4 shows a generalized flowchart for use cases that support updating information handling system settings based on the corresponding operating system and BIOS. In particular, the process 400 addresses the three use cases discussed above. In the first use case, an operating system 116 installation is performed on information handling system 100. In the second use case, the operating system 116 is already deployed and configured on the information handling system 100. In the third use case, a request is performed from the information handling system 100, which can be from applications running on the information handling system 100

The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, a determination is performed as to use case 1, 2, or 3. If use case 1, then following the "use case 1" branch of step 404, at step 406, the management controller 124 requests for an operating system 116 installation on an information handling system 100. An initial operating system 116 installation can be initiated by administrator 202.

At step 408, the system policy enforcer or SPE 120 is invoked. Implementations can provide for a system policy manager (not shown) to invoke the SPE 120. At step 410, the management controller 124 requests to stage an operating system template 206. At step 412, the management controller 124 retrieves an operating system template 206, where implementations can provide for retrieving from information handling system vendor(s)/supplier(s) sites 204 (repositories). At step 414, the management controller 124 stages the retrieved operating system template 206 in shared memory access/partition 122. The operating system template 206 staged in shared memory access/partition 122 is referred to as the operating system template 208.

At step 416, implementations provide for a system configuration manager (not shown) of the information handling system 100 to initiate BIOS EFI (Extensible Firmware Interface) service to initiate the BIOS 118. At step 418, the BIOS 118/SPE 120 authorizes the staged operating system template 208.

At step 420, the BIOS 118/SPE 120 fetches applicable policy data. For an initial operating system 116 installation, operating system 116 metadata may be retrieved. For an operating system 116 upgrade, implementations provide for BIOS ACPI (Advanced Configuration and Power Interface) to retrieve operating system 116 object data.

At step 422, the BIOS 118/SPE 120 executes system (hardware) setting configuration/reconfiguration based on the operating system template 208. At step 424, BIOS 118/SPE 120 returns status and reset is performed on the information handling system 100.

At step 426, a determination is performed as to whether status is okay. If not okay, following the NO branch of step 426, at step 428, an indication of fail and/or operating installation halted is provided. At step 430, the process 400 ends. If reconfiguration status is okay, following the YES branch of step 426, at step 432, operating system 116 installation is performed. At step 430, the process 400 ends.

If use case 2, then following the "use case 2" branch of step 404, at step 434, the BIOS 118/SPE 120 requests for an operating system 116 installation or upgrade on an information handling system 100. The process 400 follows at step 416.

If use case 3, then following the "use case 3" branch of step 404, at step 436, the information handling system 100, and particularly applications running on the information handling system 100 requests for setting (hardware) reconfiguration, such as updates to drivers, etc. At step 438, an operating system template 206 is staged in shared memory access/partition 122, referred to as operating system template 208.

At step 440, a request is made to the management controller 124 to reconfigure the settings (hardware). The process follows at step 408, and follows at step 442. At step 442, a system reset is initiated. At step 430, the process 400 ends.

Figure 5:
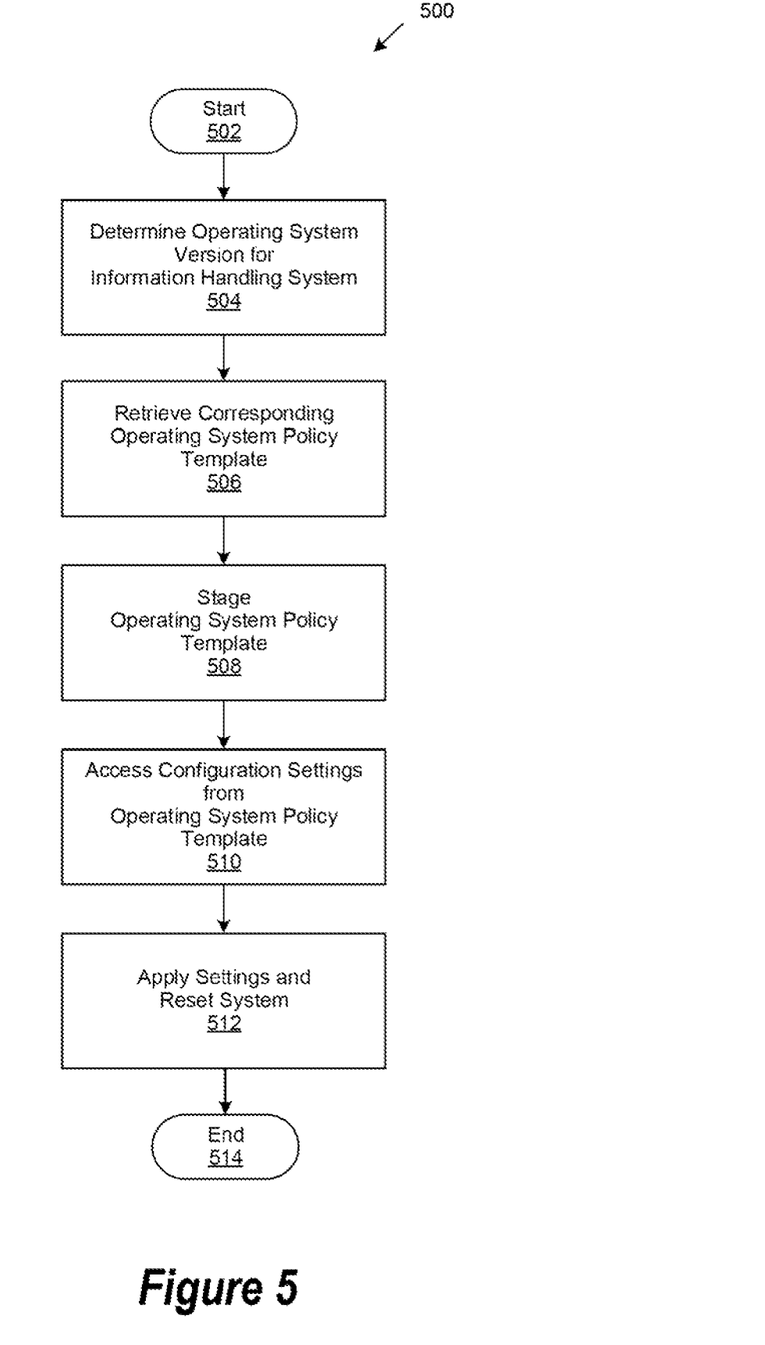
FIG. 5 is a generalized flowchart for updating system settings for a corresponding operating system version of an information handling system.

FIG. 5 shows a generalized flowchart for updating system settings for a corresponding operating system version of an information handling system. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, a determination is performed as to an operating system 116 to be installed on information handling system 100. The installation can be an initial installation or an update/upgrade of an operating system 116.

At step 506, a corresponding operating system template 206 to the operating system 116 is retrieved. The operating system policy template(s) 206 can be retrieved from information handling system vendor(s)/supplier(s) sites 204 and/or repositories.

At step 508, the corresponding operating system template 206 is staged as operating system template 208 is to shared memory access/partition 122 for access by BIOS 118/SPE 120. At step 510, the SPE accesses configuration settings from the operating system template 208.

At step 512, the settings are applied to the information handling system 100, and the information handling system 100 is reset. At step 514, the process 500 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for updating system settings for an operating system version of an information handling system comprising:
    determining a version of operating system of the information handling system;
    retrieving a corresponding operating system template to the version of the operating system, wherein the operating system template provides recommended system settings applicable over various operating systems, wherein the corresponding operating system template provides requisite information as to recommended system settings applicable over various operating systems and supported across different information handling system architecture, and includes information regarding operation system type and version, information handling system architectural platform, hardware components and system settings;
    staging the corresponding operating system template to shared memory access/partition accessible by a basic input/output system (BIOS) of the information handling system;
    accessing configuration settings from the staged corresponding operating system template by the BIOS; and
    applying the accessed configuration settings to the information handling system.

2. The computer-implementable method of claim 1, wherein the determining is an initial installation or an update of the operating system.

3. The computer-implementable method of claim 1, wherein the staging is performed by a management controller of the information handling system.

4. The computer-implementable method of claim 1, wherein the accessing is performed by a system policy enforcer residing on the BIOS.

5. The computer-implementable method of claim 1, wherein the applying is performed by a system policy enforcer residing on the BIOS.

6. The computer-implementable method of claim 1 further comprising performing system reconfigurations initiated from the information handling system.

7. The computer-implementable method of claim 1 further comprising resetting the information handling system if successful in applying the accessed configuration settings or providing failure indication if not successful.

8. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for updating system settings for an operating system version and comprising instructions executable by the processor and configured for:
    determining a version of operating system of the information handling system;
    retrieving a corresponding operating system template to the version of the operating system, wherein the operating system template provides recommended system settings applicable over various operating systems, wherein the corresponding operating system template provides requisite information as to recommended system settings applicable over various operating systems and supported across different information handling system architecture, and includes information regarding operation system type and version, information handling system architectural platform, hardware components and system settings;
    staging the corresponding operating system template to shared memory access/partition accessible by a basic input/output system (BIOS) of the information handling system;
    accessing configuration settings from the staged corresponding operating system template by the BIOS; and
    applying the accessed configuration settings to the information handling system.

9. The system of claim 8, wherein the determining is an initial installation or an update of the operating system.

10. The system of claim 8, wherein the staging is performed by a management controller of the information handling system.

11. The system of claim 8, wherein the accessing is performed by a system policy enforcer residing on the BIOS.

12. The system of claim 8, wherein the applying is performed by a system policy enforcer residing on the BIOS.

13. The system of claim 8 further comprising performing system reconfigurations initiated from the information handling system.

14. The system of claim 8 further comprising resetting the information handling system if successful in applying the accessed configuration settings or providing failure indication if not successful.

15. A non-transitory, computer-readable storage medium embodying computer program code, the computer program code comprising computer executable instructions configured for:
    determining a version of operating system of the information handling system;
    retrieving a corresponding operating system template to the version of the operating system, wherein the operating system template provides recommended system settings applicable over various operating systems, wherein the corresponding operating system template provides requisite information as to recommended system settings applicable over various operating systems and supported across different information handling system architecture, and includes information regarding operation system type and version, information handling system architectural platform, hardware components and system settings;

staging the corresponding operating system template to shared memory access/partition accessible by a basic input/output system (BIOS) of the information handling system;

accessing configuration settings from the staged corresponding operating system template by the BIOS; and applying the accessed configuration settings to the information handling system.

16. The non-transitory, computer-readable storage medium of claim 15, wherein the determining is an initial installation or an update of the operating system.

17. The non-transitory, computer-readable storage medium of claim 15, wherein the staging is performed by a management controller of the information handling system.

18. The non-transitory, computer-readable storage medium of claim 15, wherein the accessing is performed by a system policy enforcer residing on the BIOS.

19. The non-transitory, computer-readable storage medium of claim 15, wherein the applying is performed by a system policy enforcer residing on the BIOS.

20. The non-transitory, computer-readable storage medium of claim 15 further comprising performing system reconfigurations initiated from the information handling system.

\* \* \* \* \*